United States Patent [19]

George

[11] Patent Number: 5,077,333

[45] Date of Patent: Dec. 31, 1991

[54] STABILIZED POLYMER COMPOSITIONS

[75] Inventor: Eric R. George, Houston, Tex.

[73] Assignee: Shell Oil Company, Houston, Tex.

[21] Appl. No.: 692,758

[22] Filed: Apr. 29, 1991

[51] Int. Cl.$^5$ ............................................... C08K 3/32
[52] U.S. Cl. .................................... 524/417; 524/414; 524/415; 524/407; 524/706; 524/425
[58] Field of Search .............. 524/414, 415, 417, 407, 524/706, 425

[56] References Cited

U.S. PATENT DOCUMENTS

| | | | |
|---|---|---|---|
| 2,493,597 | 1/1950 | Rothrock, Jr. | 260/45.7 |
| 2,495,286 | 1/1950 | Brubaker | 260/63 |
| 2,630,421 | 3/1953 | Stamatoff | 260/45.8 |
| 2,640,044 | 5/1953 | Stamatoff | 260/45.7 |
| 2,705,227 | 3/1955 | Stamatoff | 260/45.7 |
| 2,984,647 | 5/1961 | White | 260/45.75 |
| 3,694,412 | 9/1972 | Nozaki | 260/63 |
| 3,948,850 | 4/1976 | Hudgin | 260/45.7 |
| 4,310,596 | 1/1982 | Buskirk | 524/407 |
| 4,746,686 | 5/1988 | Waller | 522/14 |
| 4,761,448 | 8/1988 | Kluttz et al. | 524/381 |
| 4,843,144 | 6/1989 | Van Broekhoven et al. | 528/392 |
| 4,880,903 | 11/1989 | Van Broekhoven et al. | 528/392 |
| 4,937,279 | 6/1990 | Betso et al. | 524/417 |
| 5,021,496 | 6/1991 | Machado et al. | 524/417 |

FOREIGN PATENT DOCUMENTS 57109848 4/1980 Japan.
1081304 2/1966 United Kingdom.

Primary Examiner—Paul R. Michl
Assistant Examiner—Tae H. Yoon
Attorney, Agent, or Firm—Denise Y. Wolfs

[57] ABSTRACT

Polymer compositions comprising an intimate mixture of a linear alternating polymer of carbon monoxide and at least one ethylenically unsaturated hydrocarbon and a mixture of a hydroxyapatite and a cupric chromite demonstrate improved stability.

20 Claims, No Drawings

STABILIZED POLYMER COMPOSITIONS

FIELD OF THE INVENTION

This invention relates to polyketone polymers, and, more particularly, to compositions of a polyketone polymer stabilized with a mixture calcium hydroxyapatite and cupric chromite.

BACKGROUND OF THE INVENTION

The class of polymers of carbon monoxide and olefins has been known for some time. U.S. Pat. No. 2,495,286 (Brubaker) discloses such polymers of relatively low carbon monoxide content in the presence of free radical initiators, e.g., peroxy compounds. G.B. 1,081,304 discloses similar polymers of higher carbon monoxide content in the presence of alkylphosphine complexes of palladium compounds as catalyst. U.S. Pat. No. 3,694,412 (Nozaki) extended the reaction to produce linear alternating polymers in the presence of arylphosphine complexes of palladium moieties and certain inert solvents.

More recently, the class of linear alternating polymers of carbon monoxide and at least one ethylenically unsaturated hydrocarbon, now becoming known as polyketones or polyketone polymers, has become of greater interest. U.S. Pat. No. 4,880,903 (VanBroekhoven et al.) discloses a linear alternating polyketone terpolymer of carbon monoxide, ethylene, and other olefinically unsaturated hydrocarbons, such as propylene. Processes for production of the polyketone polymers typically involve the use of a catalyst composition formed from a compound of a Group VIII metal selected from palladium, cobalt or nickel, the anion of a strong non-hydrohalogenic acid and a bidentate ligand of phosphorus, arsenic or antimony. U.S. Pat. No. 4,843,144 (VanBroekhoven et al.) discloses a process for preparing polymers of carbon monoxide and at least one ethylenically unsaturated hydrocarbon using a catalyst comprising a compound of palladium, the anion of a non-hydrohalogenic acid having a pKa of below about 6, and a bidentate ligand of phosphorus.

The resulting polymers are relatively high molecular weight materials having established utility as premium thermoplastics in the production of shaped articles, such as containers for food and drink and parts for the automotive industry, which are produced by processing the polyketone polymer according to well known methods.

SUMMARY OF THE INVENTION

The present invention provides certain stabilized polymeric compositions of linear alternating polymers of carbon monoxide and at least one ethylenically unsaturated hydrocarbon, and a process for the production of such stabilized compositions. The compositions are stabilized with a mixture of hydroxyapatite and cupric chromite. The hydroxyapatite is of the formula $M_{10}(PO_4)_6(OH)_2$, where M is barium (Ba), strontium (Sr), or calcium (Ca). The cupric chromite is of the formula $CuCr_2O_4$. More particularly, the invention provides compositions comprising the linear alternating polymer having a stabilizing mixture of calcium hydroxyapatite and cupric chromite incorporated therein. The resulting compositions demonstrate improved stability upon being subjected to melt processing conditions.

DESCRIPTION OF THE INVENTION

It is an object of this invention to stabilize the polyketone polymers such that their properties do not deteriorate during melt processing, or upon exposure to other conditions which would otherwise bring about a change in their properties. This object is realized by adding a stabilizing mixture to the polyketone polymer. The stabilized compositions of the invention comprise an intimate mixture of the linear alternating polyketone polymer with a stabilizing mixture of a hydroxyapatite and cupric chromite. Other objects will be apparent from the description of the invention.

The polyketone polymers of the invention are of a linear alternating structure and contain substantially one molecule of carbon monoxide for each molecule of unsaturated hydrocarbon. Suitable ethylenically unsaturated hydrocarbons for use as precursors of the polyketone polymers have up to 20 carbon atoms inclusive, preferably up to 10 carbon atoms, and are aliphatic such as ethylene and other α-olefins including propylene, 1-butene, isobutylene, 1-hexene, 1-octene and 1-dodecene, or are arylaliphatic containing an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-isopropylstyrene. The preferred polyketone polymers are copolymers of carbon monoxide and ethylene or terpolymers of carbon monoxide, ethylene and a second ethylenically unsaturated hydrocarbon of at least 3 carbon atoms, particularly an α-olefin such as propylene.

When the preferred polyketone terpolymers are employed as the major polymeric component of the blends of the invention, there will be within the terpolymer at least about 2 units incorporating a moiety of ethylene for each unit incorporating a moiety of the second hydrocarbon. Preferably, there will be from about 10 units to about 100 units incorporating a moiety of the second hydrocarbon. The polymer chain of the preferred polyketone polymers is therefore represented by the repeating formula

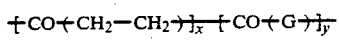

wherein G is the moiety of ethylenically unsaturated hydrocarbon of at least 3 carbon atoms polymerized through the ethylenic unsaturation and the ratio of y:x is no more than about 0.5. When copolymers of carbon monoxide and ethylene are employed in the blends of the invention, there will be no second hydrocarbon present and the copolymers are represented by the above formula wherein y is zero. When y is other than zero, i.e., terpolymers are employed, the —CO—(—CH$_2$CH$_2$—)— units and the —CO—(—G—)— units are found randomly throughout the polymer chain, and preferred ratios of y:x are from about 0.01 to about 0.1. The end groups or "caps" of the polymer chain will depend upon what materials were present during the production of the polymer and whether or how the polymer was purified. The precise nature of the end groups does not appear to influence the properties of the polymer to any considerable extent so that the polymers are fairly represented by the formula for the polymer chain as depicted above.

Of particular interest are the polyketone polymers of number average molecular weight from about 1000 to about 200,000, particularly those of number average molecular weight from about 20,000 to about 90,000 as determined by gel permeation chromatography. The physical properties of the polymer will depend in part upon the molecular weight, whether the polymer is a copolymer or a terpolymer and, in the case of terpolymers, the nature of the proportion of the second hydrocarbon present. Typical melting points for the polymers are from about 175° C. to about 300° C., more typically from about 210° C. to about 270° C. The polymers have a limiting viscosity number (LVN), measured in m-cresol at 60° C. in a standard capillary viscosity measuring device, from about 0.5 dl/g to about 10 dl/g, more frequently from about 0.8 dl/g to about 4 dl/g.

A preferred method for the production of the polyketone polymers is illustrated by U.S. Pat. No. 4,843,144 (Van Broekhoven et al.). The carbon monoxide and hydrocarbon monomer(s) are contacted under polymerization conditions in the presence of a catalyst composition formed from a compound of palladium, the anion of a non-hydrohalogenic acid having a pKa (measured in water at 18° C.) of below about 6, preferably below 2, and a bidentate ligand of phosphorus. The scope of the polymerization is extensive but, without wishing to be limited, a preferred palladium compound is a palladium carboxylate, particularly palladium acetate, a preferred anion is the anion of trifluoroacetic acid or p-toluenesulfonic acid and a preferred bidentate ligand of phosphorus is 1,3-bis(diphenylphosphino)propane or 1,3-bis[di(2-methoxyphenyl)phosphino]propane.

The polymerization to produce the polyketone polymer is conducted in an inert reaction diluent, preferably an alkanolic diluent, and methanol is preferred. The reactants, catalyst composition and reaction diluent are contacted by conventional methods such as shaking, stirring or refluxing in a suitable reaction vessel. Typical polymerization conditions include a reaction temperature from about 20° C. to about 150° C., preferably from about 50° C. to about 135° C. The reaction pressure is suitably from about 1 atmosphere to about 200 atmospheres but pressures from about 10 atmospheres to about 100 atmospheres are preferred. Subsequent to polymerization, the reaction is terminated as by cooling the reactor and contents and releasing the pressure. The polyketone polymer is typically obtained as a product substantially insoluble in the reaction diluent and the product is recovered by conventional methods such as filtration or decantation. The polyketone polymer is used as recovered or the polymer is purified as by contact with a solvent or extraction agent which is selective for catalyst residues.

During melt processing, the neat polyketone polymer exhibits an undesirable viscosity increase. It is most desirable for a thermoplastic polymer to have little or no viscosity increase during processing. Most commercial-grade engineering thermoplastics exhibit little or no change in viscosity during melt processing because of the presence of an additive package selected to minimize such a change in properties. For example, U.S. Pat. No. 2,493,597 identifies organic esters of phosphorous acid as melt viscosity stabilizers for polyamides.

The polyketone polymers of the subject invention are stabilized with a mixture of a hydroxyapatite and cupric chromite. Both hydroxyapatites and copper salts have been used as additives in polymer compositions. U.S. Pat. No. 4,937,279 (Betso et al.) discloses that the addition of an alkaline-earth hydroxyphosphate to a vinylidene chloride polymer improves the extrudability of the polymer, and Japan 57-109848 discloses the addition of a hydroxyapatite along with an inhibitor to a polyolefin polymer to improve thermal and ultraviolet light stability. U.S. Pat. No. 2,705,227 (Stamatoff) discloses that a combination of a soluble copper compound, a halogen compound, and a phosphorous compound is effective to thermally stabilize polyamides.

The hydroxyapatite component of the stabilizing mixture is of the formula $M_{10}(PO_4)_6(OH)_2$, where M is barium (Ba), strontium (Sr), or calcium (Ca). The preferred hydroxyapatite is calcium hydroxyapatite, $Ca_{10}(PO_4)_6(OH)_2$, a naturally occurring calcium phosphate and the major constituent of bone and tooth mineral. It is a finely divided, crystalline, non-stoichiometric material rich in surface ions which are readily replaced by fluoride ions. Calcium hydroxyapatite is also referred to as tribasic calcium phosphate.

The cupric chromite component of the stabilizing mixture is a chemical combination of copper, chromium, and oxygen that is represented by the formula $CuCr_2O_4$, and also by the formula $Cr_2CuO_4$. Cupric chromite is a grayish-black to black crystalline material that is practically insoluble in water. Cupric chromite may be illustratively prepared by heating cupric chromate ($CuCrO_4$), or by the decomposition of ammonium cupric chromate $(NH_4)_2Cu(CrO_4)_2$.

The mixture of hydroxyapatite and cupric chromite is employed in a stabilizing quantity. The specific amount of stabilizing mixture present, and the relative proportions of the two components of the mixture, in the compositions of the invention is not critical, as long as a stabilizing quantity is present and other important polymer properties for the intended use are not adversely affected. The precise amount of each component required for melt stabilization will depend upon a variety of factors, such as the melt temperature, the polymer's LVN, and the interactive effects of other additives and impurities present.

The hydroxyapatite is provided in an amount from about 0.001 wt % to about 5 wt % hydroxyapatite, based on the weight of polymer to be stabilized. Compositions containing from about 0.001 wt % to about 0.5 wt % hydroxyapatite, on the same basis, are believed to exhibit desirable melt stability, while compositions containing from about 0.001 wt % to about 0.3 wt % hydroxyapatite are preferred for a wide variety of uses.

The cupric chromite is provided in an amount of from about 0.001 wt % to about 0.5 wt %, based on the weight of polymer to be stabilized. Compositions containing from about 0.001 wt % to about 0.05 wt % cupric chromite on the same basis are preferred, and concentrations containing from about 0.001 wt % to about 0.005 wt % are particularly preferred.

It is within the scope of the present invention to use quantities of the components of the present stabilizing mixture outside of the ranges herein specified; but experience has shown that amounts substantially less than the minimum quantities are usually ineffectual, and quantities above the maximum amounts result in no further improvement in the polymer.

While not wishing to be bound by any particular theory, it is speculated that both the hydroxyapatite and the cupric chromite may play a role in neutralizing the effect of impurities present in the polyketone polymer that cause a viscosity increase during the melt phase, and/or inhibit crystallization upon cooling. The combination of a hydroxyapatite and a cupric chromite appears to provide a stabilizing mixture that is effective against both acidic and basic impurities.

The types and amounts of impurities present may determine the optimum ratio of hydroxyapatite to cupric chromite. One skilled in the art, without undue experimentation, will be able to determine the optimum ratio for specific applications.

The hydroxyapatite and cupric chromite components of the stabilizing mixture are added to the polyketone polymer by any method suitable for forming an intimate mixture of the polymer and stabilizers. Such methods include dry blending of the polymer and stabilizers in a finely divided form, followed by hot pressing or extrusion of the mixture. The composition may also be produced by blending the components in a melt mixing device. The stabilizer components are preferably added to the polymer at the same time, but satisfactory results are obtained when the components are added separately.

The compositions of the invention may also include other additives such as antioxidants, dyes, fillers or reinforcing agents, fire resistant materials, mold release agents, colorants and other materials designed to improve the processability of the polymers or the properties of the resulting blend. Such additives are added prior to, together with, or subsequent to the blending of the polyketone and stabilizers. The presence of these additives may affect the optimum level of stabilizers for a given application.

The compositions are processed by methods such as extrusion and injection molding into sheets, films, plates and shaped parts. The compositions of the invention are particularly useful for the production of articles by multiple melting/crystallization cycles, and where elevated temperatures are likely to be encountered. Illustrative of such applications are the production of articles useful in both rigid and flexible packaging applications, such as containers and films, and in both internal and external parts for automotive use; fibers useful in yarns, tire cord, and fabric; and coatings for a variety of materials.

The invention is further illustrated by the following Examples which should not be regarded as limiting.

EXAMPLE 1

A linear alternating terpolymer of carbon monoxide, ethylene, and propylene (89/071) was produced in the presence of a catalyst composition formed from palladium acetate, trifluoroacetic acid and 1,3-bis[di(2-methoxyphenyl)phosphino]propane. The polyketone polymer had a melting point of about 220° C. and an LVN of about 1.8 dl/g when measured in m-cresol at 60° C. The polyketone polymer also contained 0.5% Ethanox 330 and 0.5% Nucrel 535.

EXAMPLE 2

A portion of the polymer of Example 1 was ground to 60 mesh, and then powder-mixed with calcium hydroxyapatite (with a theoretical mole ratio of 1.67 Ca:P) and/or the cupric chromite in a Henschel mixer for 5 minutes. Samples containing various concentrations of calcium hydroxyapatite and/or cupric chromite were prepared, as shown in Table 1. The samples were compounded in a ¾ in. Braebender single screw extruder, operating at 60 to 100 rpm with melt temperatures between 230° and 250° C. The viscosity of each sample was determined over time in the melt in a Rheometrics parallel plate rheometer operated at 275° C. Table 1 lists the initial melt viscosity and the viscosity after 10 minutes. During commercial processing, polymers are typically in a melt phase for less than 10 minutes.

TABLE 1

| Calcium Hydroxyapatite (wt %) | Cupric Chromite (wt %) | Viscosity (Pa.-sec.) | |
|---|---|---|---|
| | | 0 min | 10 min |
| 0 | 0 | 965 | 4820 |
| 0.004 | 0 | 800 | 3300 |
| 0.04 | 0 | 965 | 3600 |
| 0.25 | 0 | 965 | 3437 |
| 0 | 0.005 | 1000 | 4900 |
| 0 | 0.05 | 1000 | 5500 |
| 0.004 | 0.005 | 800 | 3100 |
| 0.04 | 0.005 | 857 | 4501 |
| 0.04 | 0.05 | 965 | 4957 |
| 0.25 | 0.05 | 700 | 3900 |

The combination of small amounts of calcium hydroxyapatite with cupric chromite (at 0.004 wt % and 0.005 wt %, respectively) provided initial melt viscosity stabilization equivalent to the same amount of calcium hydroxyapatite alone (i.e. 0.004 wt %), and better stabilization after 10 minutes. The sample containing 0.25 wt % calcium hydroxyapatite and 0.05 wt % cupric chromite provided a significant reduction in initial melt viscosity, although the stabilization after 10 minutes was less attractive than some of the other samples. Even at these high concentrations, the total weight of the stabilizing mixture is only about 0.30 wt %, a relatively low amount for stabilizers.

EXAMPLE 3

The samples described in Example 2 were evaluated in a differential scanning calorimeter (DSC). The tests were run with a Perkin-Elmer DSC, which employs sealed pan containers. The pan and contents were heated at a controlled rate, typically 20° C./min, until the sample melted. The pan and contents were then cooled until the sample solidified or partially crystallized. The samples were then heated to 275° C., maintained at that temperature for 10 minutes, and then cooled again. The holding temperature of 275° C. is typical for commercial melt processing operations. The first and second heats of crystallization ($HC_1$ and $HC_2$) of the samples were determined, in calories per gram, through use of the DSC.

In general, the heat of crystallization for a stabilized polymer will be greater than the corresponding value for an unstabilized polymer. However, the heat of crystallization for a stabilized polymer will decrease over repeated heating/cooling cycles. The heat of crystallization serves as an indication of the amount of crystallinity of the polymer. Degradation of the polymer during heating can inhibit crystallization upon cooling. The ratio of $HC_2$ to $HC_1$ for a given sample serves as a measure of the degree of crystallinity maintained over the two heating cycles. For a polymer exhibiting ideal melt stability (assuming no nucleating effects), this ratio is 1. The $HC_2/HC_1$ ratio for each sample is shown in Table 2.

TABLE 2

| Calcium Hydroxyapatite (wt %) | Cupric Chromite (wt %) | $HC_2/HC_1$ |
|---|---|---|
| 0 | 0 | 0.65 |
| 0.004 | 0 | 0.75 |
| 0.25 | 0 | 0.92 |

TABLE 2-continued

| Calcium Hydroxyapatite (wt %) | Cupric Chromite (wt %) | $HC_2/HC_1$ |
|---|---|---|
| 0.004 | 0.05 | 0.88 |
| 0.25 | 0.05 | 0.89 |

The $HC_2/HC_1$ ratios indicate that combinations of calcium hydroxyapatite and cupric chromite provided a significant increase in the amount of crystallinity maintained during a second heating/cooling cycle, relative to the neat polymer. Calcium hydroxyapatite alone (at 0.25 wt %) was somewhat more effective at maintaining crystallinity.

EXAMPLE 4

For comparison, a portion of the polymer described in Examples 1 and 2 was powder-mixed with calcium hydroxyapatite (with a theoretical mole ratio of 1.67 Ca:P) and/or cuprous iodide (not of the invention) in a Henschel mixer for 5 minutes. Samples containing various concentrations of calcium hydroxyapatite and/or cuprous iodide were prepared, as shown in Table 3. The samples were compounded in a ¾ in. Braebender single screw extruder, and the viscosity of each sample determined, as described in Example 2. Table 3 lists the initial melt viscosity and the viscosity after 10 minutes.

TABLE 3

| Calcium Hydroxyapatite (wt %) | Cuprous Iodide (wt %) | Viscosity (Pa.-sec.) 0 min | Viscosity (Pa.-sec.) 10 min |
|---|---|---|---|
| 0 | 0 | 965 | 4820 |
| 0.004 | 0 | 800 | 3300 |
| 0.25 | 0 | 965 | 3437 |
| 0 | 0.006 | 1600 | 8500 |
| 0.004 | 0.006 | 2000 | 13000 |
| 0.25 | 0.006 | 800 | 4300 |

To compare the examples using cupric chromite with the examples using cupric iodide, the same amounts on a molar basis, rather than a weight basis, should be used. On a molar basis, the concentration of 0.004 wt % calcium hydroxyapatite and 0.006 wt % cuprous iodide is equivalent to a concentration of 0.004 wt % calcium hydroxyapatite and 0.005 wt % cupric chromite. The results in Table 4 indicate that a combination of calcium hydroxyapatite with cupric iodide is generally less effective than the combination of calcium hydroxyapatite with cupric chromite.

The Examples above demonstrate that combinations of calcium hydroxyapatite and cupric chromite, when added to the polyketone polymer, can significantly mitigate the viscosity increase that would otherwise occur. Certain combinations of the two stabilizers are even more effective than either one added individually. Some metals, such as copper, often have a detrimental impact on polymer stability. The results obtained with a combination of calcium hydroxyapatite and cupric chromite are unexpected, particularly in view of the results obtained from a combination of calcium hydroxyapatite with cuprous iodide.

What is claimed is:

1. A stabilized polymer composition comprising:
    a linear alternating polymer of carbon monoxide and at least one ethylenically unsaturated hydrocarbon; and
    a mixture of a hydroxyapatite and a cupric chromite, wherein the mixture is present in the composition in a stabilizing amount.

2. The composition of claim 1 wherein the polymer is of the repeating formula

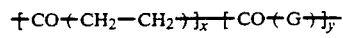

wherein G is a moiety of an ethylenically unsaturated hydrocarbon of at least 3 carbon atoms, polymerized through the ethylenic unsaturation, and the ratio of y:x is no more than about 0.5.

3. The composition of claim 2 wherein the hydroxyapatite is calcium hydroxyapatite.

4. The composition of claim 3 wherein y is 0.

5. The composition of claim 3 wherein the ratio of y:x is from 0.01 to about 0.1.

6. The composition of claim 3 wherein G is a moiety of propylene.

7. The composition of claim 3 wherein the calcium hydroxyapatite is present in a quantity of from about 0.001 wt % to about 5 wt %, based on total composition, and the cupric chromite is present in a quantity of from about 0.001 wt % to about 0.05 wt %, based on total composition.

8. A composition stabilized against a change in viscosity during melt processing which comprises a linear alternating polymer of carbon monoxide and at least one ethylenically unsaturated hydrocarbon having incorporated therein a stabilizing quantity of a mixture of hydroxyapatite and cupric chromite.

9. The composition of claim 8 wherein the polymer is of the repeating formula

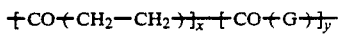

wherein G is a moiety of an ethylenically unsaturated hydrocarbon of at least 3 carbon atoms, polymerized through the ethylenic unsaturation, and the ratio of y:x is no more than about 0.5.

10. The composition of claim 9 wherein the hydroxyapatite is calcium hydroxyapatite.

11. The composition of claim 10 wherein y is 0.

12. The composition of claim 10 wherein the ratio of y:x is from 0.01 to about 0.1.

13. The composition of claim 10 wherein G is a moiety of propylene.

14. The composition of claim 10 wherein the calcium hydroxyapatite is present in a quantity of from less than about 0.001 wt % to about 5 wt %, based on total composition, and the cupric chromite is present in a quantity of from about 0.001 wt % to about 0.05 wt %, based on total composition.

15. A method of stabilizing a linear alternating polymer of carbon monoxide and at least one ethylenically unsaturated hydrocarbon by incorporating therein a stabilizing mixture of a hydroxyapatite and a cupric chromite.

16. The method of claim 15 wherein the polymer is of the repeating formula

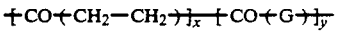

wherein G is a moiety of an ethylenically unsaturated hydrocarbon of at least 3 carbon atoms polymerized through the ethylenic unsaturation, and the ratio of y:x is no more than about 0.5.

17. The method of claim 16 wherein the hydroxyapatite is calcium hydroxyapatite.

18. The method of claim 17 wherein y is 0.

19. The method of claim 17 wherein the ratio of y:x is from about 0.01 to about 0.1.

20. The method of claim 17 wherein G is a moiety of propylene.

* * * * *